United States Patent
Suzuki et al.

(10) Patent No.: US 8,229,032 B2
(45) Date of Patent: Jul. 24, 2012

(54) SIGNAL RECEIVER FOR RECEIVING DIFFERENTIAL SIGNAL VIA TRANSMISSION LINE

(75) Inventors: Youichirou Suzuki, Nishio (JP); Noboru Maeda, Chiryu (JP); Shigeki Takahashi, Okazaki (JP); Koji Kondo, Tokoname (JP); Kazuyoshi Nagase, Kitanagoya (JP); Takahisa Koyasu, Chita (JP)

(73) Assignees: DENSO CORPORATION, Kariya (JP); Nippon Soken, Inc., Nishio (JP)

( * ) Notice: Subject to any disclaimer, the term of this patent is extended or adjusted under 35 U.S.C. 154(b) by 728 days.

(21) Appl. No.: 12/389,691

(22) Filed: Feb. 20, 2009

(65) Prior Publication Data

US 2009/0296830 A1 Dec. 3, 2009

(30) Foreign Application Priority Data

May 30, 2008 (JP) .................. 2008-142478

(51) Int. Cl.
*H03K 9/00* (2006.01)
(52) U.S. Cl. ........................................ 375/316
(58) Field of Classification Search .................. 375/316, 375/219, 244, 257, 288, 295; 341/60; 326/30; 333/12
See application file for complete search history.

(56) References Cited

U.S. PATENT DOCUMENTS

| | | | |
|---|---|---|---|
| 6,326,803 B1 | 12/2001 | Takeda | |
| 2004/0155720 A1 | 8/2004 | Yasui et al. | |
| 2007/0182601 A1* | 8/2007 | Ueno | 341/60 |

FOREIGN PATENT DOCUMENTS

| | | | |
|---|---|---|---|
| JP | S63-136726 A | | 6/1988 |
| JP | 08162930 A | * | 6/1996 |
| JP | 2005-244351 A | | 9/2005 |
| JP | A-2007-318734 | | 12/2007 |

OTHER PUBLICATIONS

Office Action mailed Jul. 26, 2010 in corresponding German patent application No. 10 2009 022 578.1 (and English translation).

* cited by examiner

*Primary Examiner* — Chieh M Fan
*Assistant Examiner* — Shawkat M Ali
(74) *Attorney, Agent, or Firm* — Posz Law Group, PLC

(57) ABSTRACT

A signal receiver includes: a receiving circuit that receives a differential signal via a transmission line, which includes a pair of signal wires for transmitting the differential signal; and an impedance control circuit that controls an input impedance so as to reduce a common mode noise. The impedance control circuit includes a detection element for detecting at least one of a voltage, a current and an electric power of the common mode noise. The impedance control circuit controls the input impedance in accordance with change of the at least one of the voltages the current and the electric power of the common mode noise.

10 Claims, 6 Drawing Sheets

SIGNAL RECEIVER FOR RECEIVING DIFFERENTIAL SIGNAL VIA TRANSMISSION LINE

CROSS REFERENCE TO RELATED APPLICATION

This application is based on Japanese Patent Application No. 2008-142478 filed on May 30, 2008, the disclosure of which is incorporated herein by reference.

FIELD OF THE INVENTION

The present invention relates to a signal receiver for receiving a differential signal via a transmission line.

BACKGROUND OF THE INVENTION

Recently, a differential signal is transmitted through a transmission path so that communication is performed. The transmission path includes a pair of signal wires. In this case, it is necessary to remove a common mode noise, which is applied in each signal wire. Here, the common mode noise is defined on the basis of a ground level. For example, in JP-A-2005-244351, a choke coil for blocking a differential signal in a normal mode and for passing a common mode noise is connected between the transmission path and a ground.

However, in the above case, since the choke coil is always connected between the transmission path and the ground, a capacitance between the pair of signal wires increases, so that a communication signal may be affected by the capacitance. Thus, it is requested to remove the common mode noise without affecting a waveform of the communication signal.

SUMMARY OF THE INVENTION

In view of the above-described problem, it is an object of the present disclosure to provide a signal receiver for receiving a differential signal via a transmission line.

According to an aspect of the present disclosure, a signal receiver includes: a receiving circuit that receives a differential signal via a transmission line, which includes a pair of signal wires for transmitting the differential signal; and an impedance control circuit that controls an input impedance so as to reduce a common mode noise. The impedance control circuit includes a detection element for detecting at least one of a voltage, a current and an electric power of the common mode noise, and the impedance control circuit controls the input impedance in accordance with change of the at least one of the voltage, the current and the electric power of the common mode noise.

In the above receiver, only when the common mode noise is applied to the transmission line, the common mode noise is removed by controlling the input impedance of the receiving circuit determining from a transmission line side.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
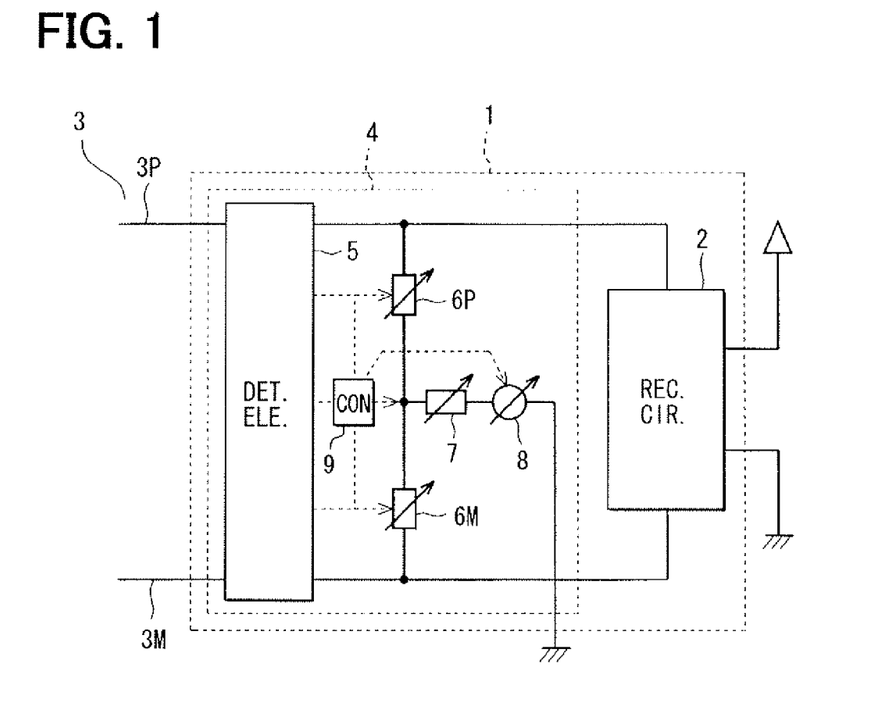
FIG. 1 is a block diagram showing a signal receiver according to a first embodiment.

A signal receiver 1 according to a first embodiment will be explained with reference to FIGS. 1 and 2. The receiver 1 includes a receiving circuit 2 and an impedance control circuit 4. The impedance control circuit 4 is arranged between a transmission line 3 and the receiving circuit 2.

The impedance control circuit 4 includes a detection element 5, a pair of variable impedance elements 6P, 6M, another variable impedance element 7, a control power source 8 and controller 9. The detection element 5 is arranged between the transmission line 3 and the receiving circuit 2. Further, the detection element 5 is disposed between a pair of signal wires 3P, 3M, which provides the transmission line 3. The impedance elements 6P, 6M are arranged between the signal wires 3P, 3M, and are coupled in series with each other. The impedance elements 6P, 6M are coupled with each other at a connection portion. The other variable impedance element 7 and the control power source 8 are coupled in series with each other, and are arranged between the connection portion of the impedance elements 6P, 6M and a ground. The controller 9 controls the variable impedance elements 6P, 6M, the other variable impedance element 7 and the control power source 8 based on detection results of the detection element 5.

The detection element 5 detects at least one of a voltage, a current and an electric power of a common mode noise, which is applied to the signal wires 3P, 3M. Alternatively, the detection element 5 may detect two of the voltage, the current and the electric power of the common mode noise, or detect all of the voltage, the current and the electric power of the common mode noise. The detection result of the detection element 5 is output to the controller 9. The controller 9 controls an impedance of each of the variable impedance elements 6P, 6M, 7 and a voltage of the control power source 8 in accordance with the detection result of the detection element 5. Here, the impedance of the impedance element 6P is set to be equal to the impedance of the impedance element 6M.

Figure 2:
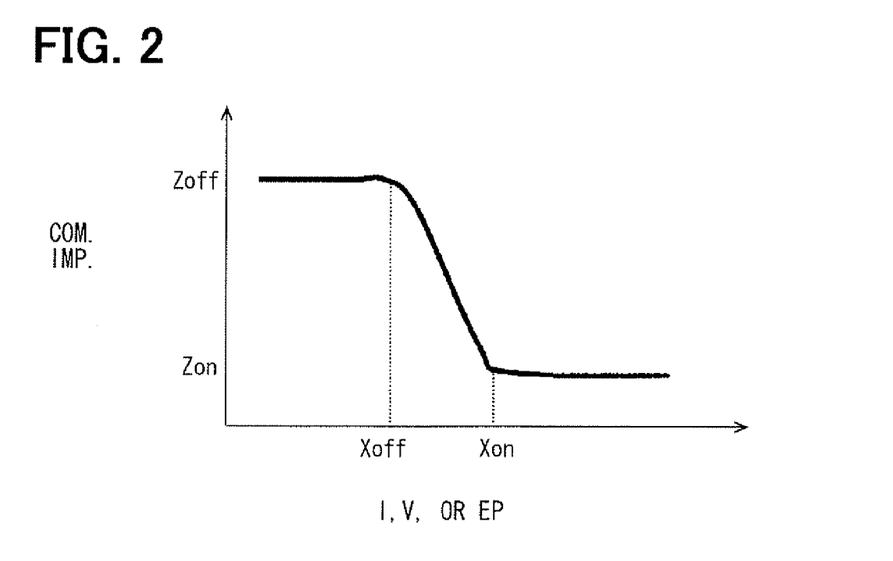
FIG. 2 is a graph showing a relationship between a voltage, a current or an electric power and an impedance of an impedance control circuit.

FIG. 2 shows an example case where the controller 9 controls the impedances of the impedance elements 6P, 6M, 7 so that the common mode impedances of the signal wires 3P, 3M are changed. A horizontal axis in FIG. 2 represents the current, the voltage or the electric power of the common mode noise, and a vertical axis represents the common mode impedance of each signal wire 3P, 3M. When the current, the voltage or the electric power of the common mode noise increases, the controller 9 controls to reduce the common mode impedance from Zoff to Zon. In this case, the impedance Zoff is much larger than the impedance ZR of the receiving circuit 2, i.e., Zoff>>ZR. Thus, a parallel impedance between the impedance Zoff of the signal wires 3P, 3M and the impedance ZR of the receiving circuit 2 is almost equal to ZR. Another parallel impedance Zcom between the impedance Zon of the signal wires 3P, 3M and the impedance ZR of the receiving circuit 2 is set to be sufficiently small in order to reduce the common mode noise. Here, the impedance Zcom provides to reduce the common mode noise.

The controller 9 controls the control power source 8 to change a power source voltage in accordance with polarity of the common mode noise. For example, when the noise has a positive polarity, the voltage of the control power source 8 is set to be the ground level. When the noise has a negative polarity, the voltage of the control power source 8 is set to be a high level such as five volts. Thus, an impedance between the ground and the transmission line 3 and an impedance between a power source and the transmission line 3 are reduced. When the voltage of the control power source 8 is high level, the impedance elements 6P, 6M 7 exhibit a negative resistance.

In the impedance control circuit 4 in the receiver 1, the detection element 5 detects at least one of the voltage, the current and the electric power of the common mode noise applied in the transmission line 3, so that the impedance control circuit 4 controls an input impedance in order to reduce the level of the common mode noise in accordance with change of the at least one of the voltage, the current and the electric power. Accordingly, only when the common mode noise is actually applied to the transmission line 3, the common mode noise is removed by changing the input impedance of the receiving circuit 2. Here, the input impedance of the receiving circuit 2 is defined from a transmission line side. In other cases, the waveform of the communication signal is not affected. The impedance control circuit 4 controls the electric potential of the transmission line 3 with respect to a predetermined voltage or a ground level by using the control power source 8. Thus, the impedance control circuit 4 can control the input impedance equivalently.

Second Embodiment

Figure 3:
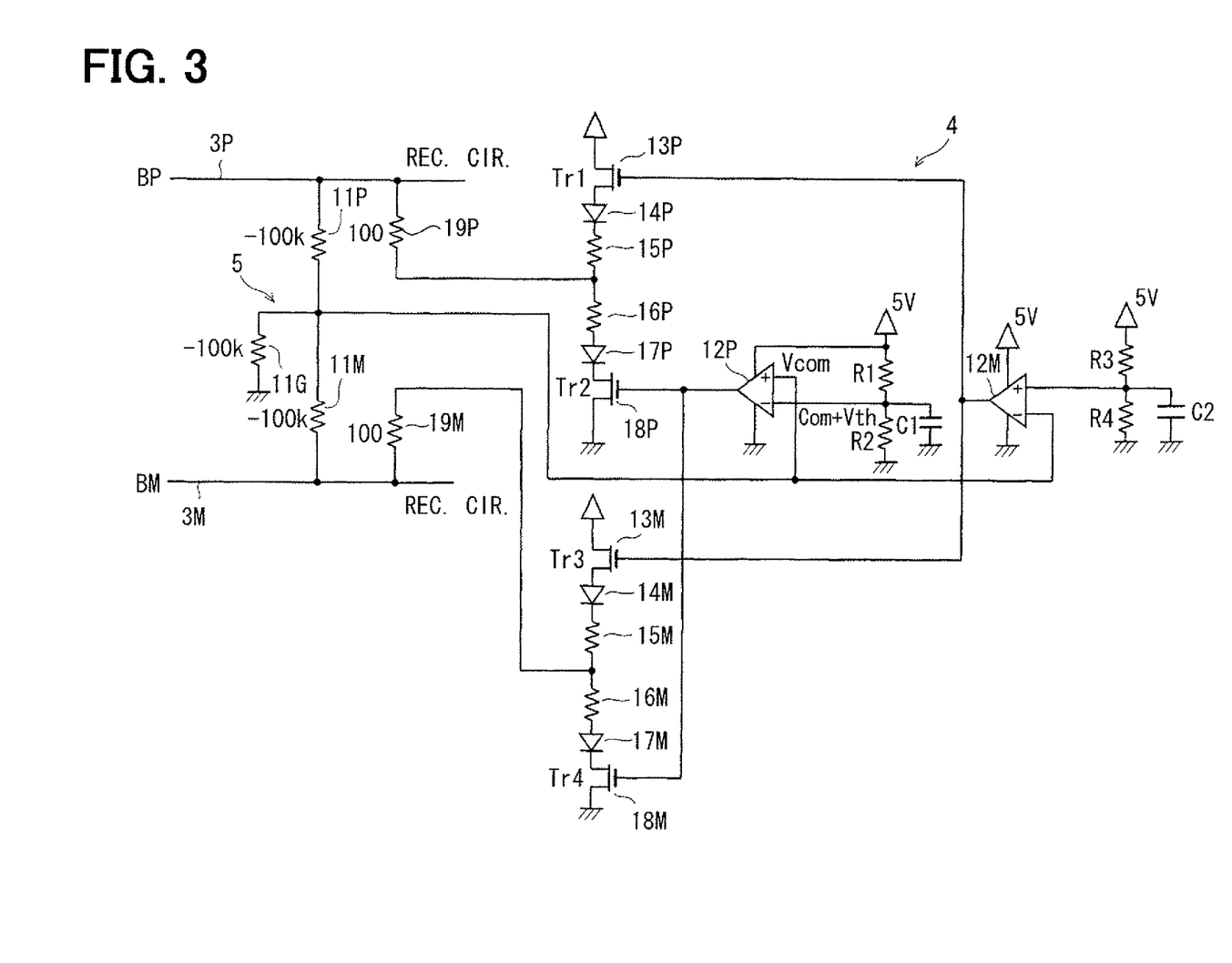
FIG. 3 is a circuit diagram showing an impedance control circuit according to a second embodiment.

FIG. 3 shows an example of the signal receiver 1. The detection element 5 includes a pair of resistors 11P, 11M and another resistor 11G. The pair of resistors 11P, 11M is connected between the signal wires 3P, 3M, and each resistor 11P, 11M has a resistance of 100 kΩ, for example. The resistors 11P, 11M are connected in series with each other at a connection portion. The other resistor 11G is connected between the connection portion and the ground. The other resistor 11G also has a resistance of 100 kΩ, for example. The connection portion of the resistors 11P, 11M is used for detecting a common mode voltage Vcom. The connection portion is coupled with a non-inverting input terminal of a comparator 12P and an inverting input terminal of another comparator 12M.

The inverting input terminal of the comparator 12P is connected to a connection portion between resistors R1, R2, which are arranged between a 5V power source and the ground. The resistors R1, R2 are coupled in series with each other at the connection portion. A noise detection threshold is determined by a ratio between the resistors R1, R2. For example, the electric potential of the connection portion is set to be Com+Vth. Here, Com represents an electric potential between the signal line 3P, 3m and the ground. For example, Com is three volts. Thus, the threshold is set to be +Vth with respect to the potential Com. Further, a capacitor C1 is coupled between the connection portion of the resistors R1, R2 and the ground. The non-inverting input terminal of the comparator 12M is connected to the connection portion between the resistors R3, R4, which are coupled between the 5V power source and the ground. The resistors R3, R4 are coupled in series with each other at the connection portion. A noise detection threshold is determined by a ratio between the resistors R3, R4. For example, the electric potential of the connection portion is set to be Com−Vth. Thus, the threshold is set to be −Vth with respect to the potential Com. Further, a capacitor C2 is coupled between the connection portion of the resistors R3, R4 and the ground.

A N-channel MOSFET 13M as a switching circuit, a diode 14M, resistors 15M, 16M as an impedance element, another diode 17M as a backflow prevention element, and another N-channel MOSFET 18M as a switching circuit are connected in series between a power source and the ground. Further, a N-channel MOSFET 13P as a switching circuit, a diode 14P, resistors 15P, 16P as an impedance element, another diode 17P as a backflow prevention element, and another N-channel MOSFET 18P as a switching circuit are connected in series between a power source and the ground. A gate of each FET 13P, 13M is connected to an output terminal of the comparator 12M, and a gate of each FET 18P, 18M is connected to an output terminal of the comparator 12P.

The connection portion between the resistors 15P, 16P is connected to the signal wire 3P via a resistor 19P as an impedance element. The resistor 19P has a resistance of 100Ω, for example. The connection portion between the resistors 15M, 16M is connected to the signal wire 3M via a resistor 19M as an impedance element. The resistor 19M has a resistance of 100Ω, for example. Here, the 5V power source and the ground in FIG. 3 correspond to the control power source 8 in FIG. 1.

The functions of the receiver 1 in FIG. 3 will be explained with reference to FIGS. 4 and 5. When the common mode noise having the positive polarity is applied to the transmission line 3, the common mode voltage Vcom increases. When the common mode voltage Vcom exceeds the positive side threshold of Com+Vth, the comparator 12P functions so that the FETs 18M, 18P turn on. Then, the transmission line 3 is connected to the ground via the resistors 19P, 19M, 16P, 16M, so that the common mode impedance is reduced. Thus, the common mode noise is reduced.

When the common mode noise having the negative polarity is applied to the transmission line 3, the common mode voltage Vcom decreases. When the common mode voltage Vcom falls below the negative side threshold of Com—Vth, the comparator 12M functions so that the FETs 13M, 13P turn on. Then, the transmission line 3 is connected to the power source via the resistors 19P, 19M, 15P, 15M, so that the common mode impedance is reduced. Thus, the common mode noise is reduced. Here, the diodes 14P, 14M, 17P, 17M function as a backflow prevention element when the FETs 13P, 13M turn on.

Figure 4A:
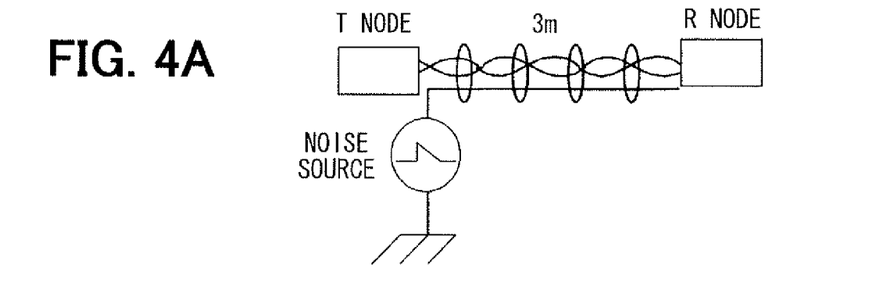
FIG. 4A is a circuit diagram showing a method of simulation of a common mode noise.
Figure 4B:
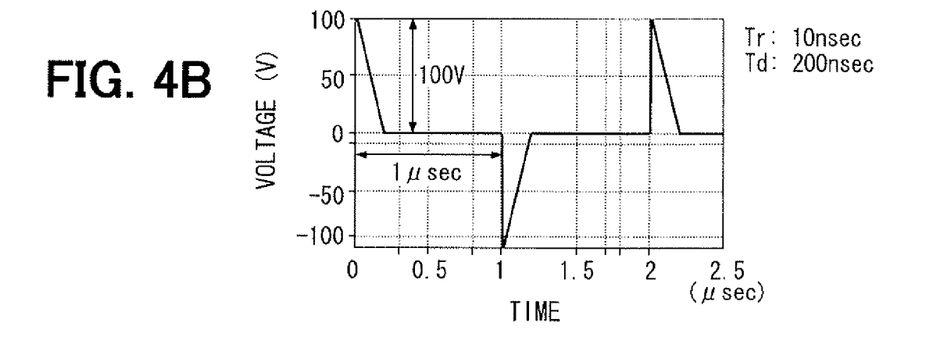
FIG. 4B is a graph showing a common mode noise.

FIGS. 4A to 4D and FIGS. 5A to 5D show simulation results of noise reduction effect of the impedance control circuit 4. As shown in FIG. 4A, when a length of the transmission line 3 between a transmitting node and a receiving node is three meters, a common mode noise source generates a common mode noise, and the noise is induced to the transmission line 3. As shown in FIG. 4B, the noise has a wave height of 100 volts, a time width of generating the noise of 10 nano seconds, and a cycle of 200 nano seconds. A FlexRay (which is the registered trademark), one of in-vehicle LAN systems, is used for the test together with a communication protocol. The voltage of Vth is set to be 1.5 volts.

Figure 4C:
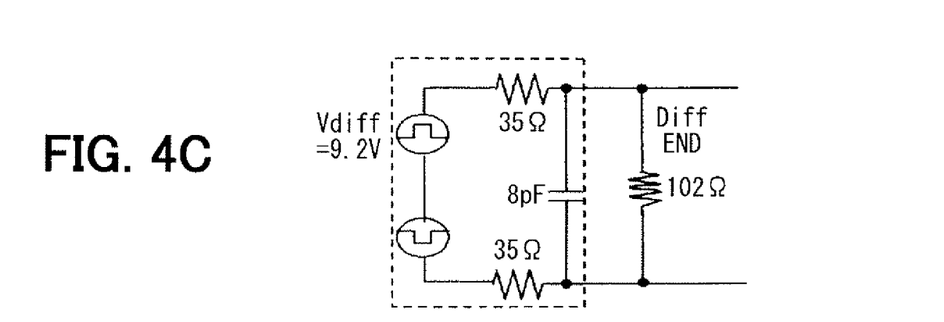
FIG. 4C is a circuit diagram showing a transmitting node.
Figure 4D:
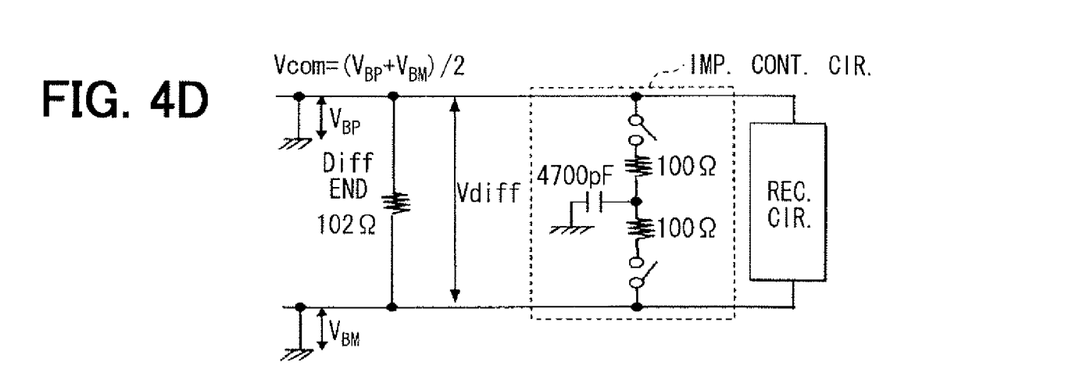
FIG. 4D is a circuit diagram showing a receiving node.

The transmitting node has an equivalent circuit shown in FIG. 4C, and a circuit surrounded with a dot corresponds to an IC equivalent circuit model. The receiving node has an equivalent circuit shown in FIG. 4D. In FIG. 4D, IMP CONT CIR represents an impedance control circuit, and REC CIR represents a receiving circuit. In FIG. 4D, a threshold voltage of each switch is 1.5 volts, and the receiving circuit is molded with parameter.

Figure 5A:
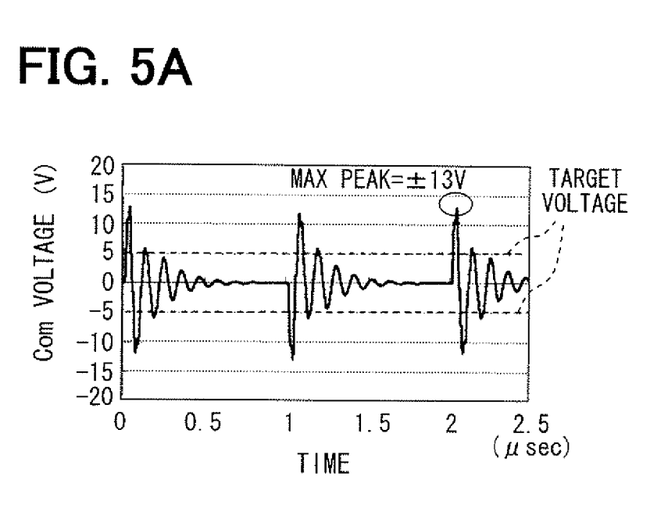
FIG. 5A is a graph showing a simulation result of an induction noise voltage in a case where the receiver includes no impedance control circuit.
Figure 5B:
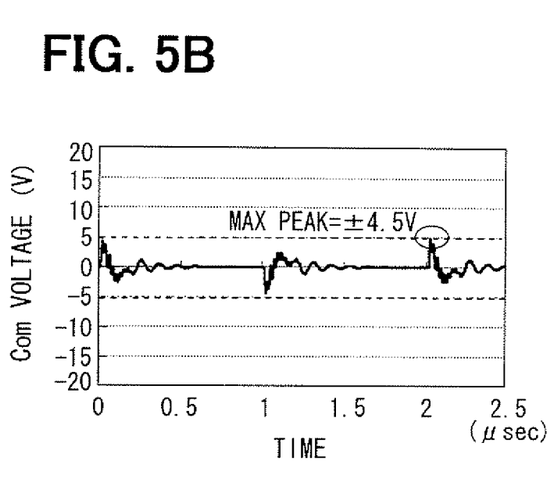
FIG. 5B is a graph showing a simulation result of the induction noise voltage in a case where the receiver includes an impedance control circuit.
Figure 5C:
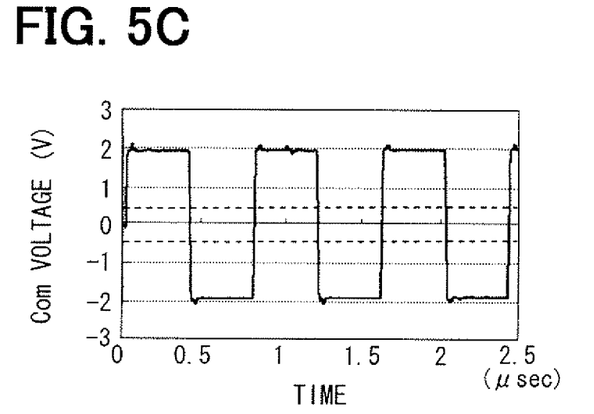
FIG. 5C is a graph showing a simulation result of a communication voltage in a case where the receiver includes no impedance control circuit.
Figure 5D:
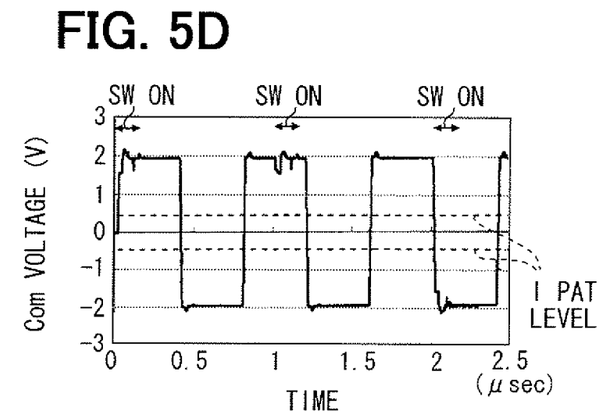
FIG. 5D is a graph showing a simulation result of the communication voltage in a case where the receiver includes the impedance control circuit.

FIGS. 5A and 5B show a comparison of an induction noise voltage. FIG. 5A shows a case where there is no impedance control circuit 4, and FIG. 5B shows a case where there is the impedance control circuit 4. When the transmission line 3 does not include the impedance control circuit 4, a maximum peak voltage is ±13 volts. When the transmission line 3 includes the impedance control circuit 4, a maximum peak voltage is ±4.5 volts. FIGS. 5C and 5D show a comparison of a communication signal voltage. FIG. 5C shows a case where there is no impedance control circuit 4, and FIG. 5D shows a case where there is the impedance control circuit 4. The waveform in a case where the transmission line 3 includes the impedance control circuit 4 is slightly inferior to the waveform in a case where the transmission line 3 does not include the impedance control circuit 4. However, the waveform in FIG. 5D is clearly satisfied with an eye pattern amplitude level, so that the waveform does not affect the communication. Here, the eye pattern is defined by Japan Automotive Software Platform Architecture (JasPar), which is a standardization promotion organization of an in-vehicle LAN.

The impedance control circuit 4 compares the common mode voltage Vcom in the transmission line 3 with the positive side threshold voltage of Com+Vth, which is a sum of the direct current voltage Com between the transmission line 3 and the ground and a predetermined margin voltage +Vth. When the common mode voltage Vcom exceeds the positive side threshold voltage, the FETs 18P, 18M turn on so that the signal wires 3P, 3M are connected to the ground via the resistors 19P, 19M, 16P, 16M, respectively. Accordingly, when the common mode noise having the positive polarity is applied to the transmission line 3, the input impedance of the signal receiver 1 is reduced.

The impedance control circuit 4 compares the common mode voltage Vcom in the transmission line 3 with the negative side threshold voltage of Com−Vth, which is a sum of the direct current voltage Com between the transmission line 3 and the ground and a predetermined margin voltage −Vth. When the common mode voltage Vcom falls below the negative side threshold voltage, the FETs 13P, 13M turn on so that the signal wires 3P, 3M are connected to the control power source via the resistors 19P, 19M, 15P, 15M, respectively. Accordingly, when the common mode noise having the negative polarity is applied to the transmission line 3, the input impedance of the signal receiver 1 can be controlled by changing the control power voltage and the impedances of the resistors 19P, 19M, 15P, 15M. When the FETs 13P, 13M, 18P, 18M turn on, the diodes 14P, 14M, 17P, 17M prevents from current backflow.

Third Embodiment

Figure 6:
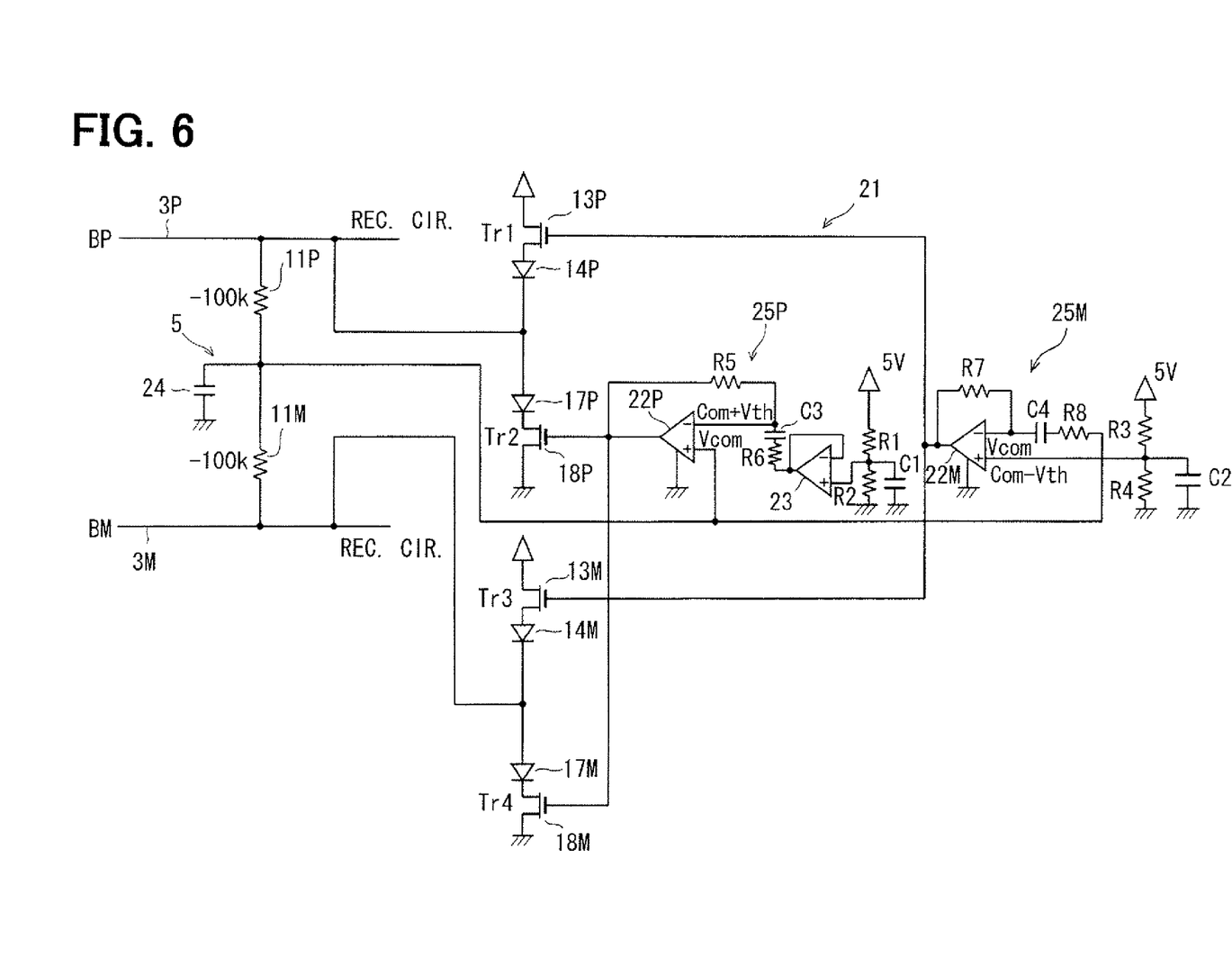
FIG. 6 is a circuit diagram showing an impedance control circuit according to a third embodiment.

FIG. 6 shows an example of the signal receiver 1. An impedance control circuit 21 in FIG. 6 includes operational amplifiers 22P, 22M instead of the comparators 12P, 12M in FIG. 3 and does not include the resistors 15P, 15M, 16P, 16M, 19P, 16M. The operational amplifier 22P as a positive side conduction control element has an inverting input terminal, which is connected to an output terminal of the operational amplifier 22P via the resistor R5. Further, the inverting input terminal of the operational amplifier 22P is connected to an output terminal of the operational amplifier 23 via a capacitor C3 and a resistor R6.

The operational amplifier 23 includes an inverting input terminal connecting to an output terminal of the amplifier 23 so that the amplifier 23 provides a voltage buffer. A non-inverting input terminal of the amplifier 23 is connected to a connection portion between the resistors R1, R2. The amplifier 23 prevents penetration of the noise from the ground side. A capacitor 24 having a small capacitance is connected between the connection portion of the resistors R1, R2 and the ground. Thus, the resistor 11G in FIG. 3 is replaced to the capacitor 24 in FIG. 6. The capacitor 24 removes a high frequency noise.

An inverting input terminal of an operational amplifier 22M corresponding to a negative side conduction control element is connected to an output terminal of the amplifier 22M via the resistor R7. Further, the inverting input terminal of the amplifier 22M is connected to a connection portion between the resistors R3, R4 via the capacitor C4 and the resistor R8. The operational amplifiers 22P, 22M provide differential amplifier circuits 25P, 25M, respectively. The capacitors C3, C4 prevent detection delay of a rising edge and a falling edge by differentiating the common mode voltage Vcom.

The functions of the signal receiver 1 in FIG. 6 will be explained as follows. The differential amplifier circuits 25P, 25M control the on-state of the FETs 13P, 13M, 18P, 18M, respectively, based on the output signal, which is obtained by differentially amplifying a difference between the common mode voltage Vcom in the transmission line 3 and the positive side threshold voltage (i.e., Com+Vth) or the negative side threshold voltage (i.e., Com−Vth). In this case, the amplification factor is determined by the resistances of the resistors R5, R6, R7, R8. Thus, it is possible to operate the FETs 13P, 13M, 18P, 18M in a linear operation region. By controlling the on-state resistances of the FETs 13P, 13M, 18P, 18M, the input impedance of the signal receiver 1 is controlled. Thus, in this embodiment, the FETs 13P, 13M, 18P, 18M function as an impedance element, respectively.

The impedance control circuit 21 differentially amplifies the difference between the common mode voltage Vcom in the transmission line 3 and the positive side threshold voltage or the negative side threshold voltage, so that the circuit 21 controls the conduction of the FETs 13P, 13M, 18P, 18M. Thus, when the positive or negative common mode noise is applied to the transmission line 3, the input impedance of the signal receiver 1 is controlled by changing the impedance that is determined by the conduction of the FETs 13P, 13M, 18P, 18M.

Fourth Embodiment

Figure 7:
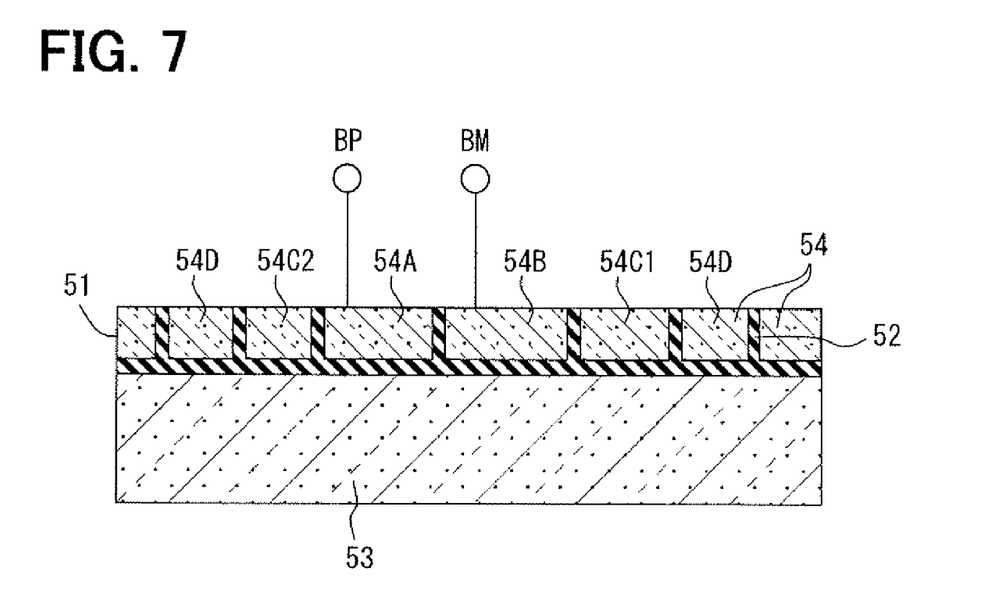
FIG. 7 is a diagram showing a floating structure according to a fourth embodiment.

FIG. 7 shows a floating structure according to a fourth embodiment. A semiconductor substrate 53 includes a semiconductor layer 51 disposed on one side of the substrate 53. Further, the substrate 53 includes multiple circuit blocks 54, which is disposed in the semiconductor layer 51. The circuit blocks 54 are isolated from each other by an insulation film 52 made of, for example, $SiO_2$. The circuit blocks 54 includes first to fifth circuit blocks 54A-54D. The first circuit block 54A functions based on an electric potential of a terminal BP as a reference. The second circuit block 54B functions based on an electric potential of a terminal BM as a reference The third circuit block 54C1 transmits information between different reference voltage circuit blocks 54A, 54D. The fourth circuit block 54C2 transmits information between different reference voltage circuit blocks 54B, 54D. The fifth circuit block 54D functions based on a ground level as a reference. The terminal BP is connected to the first circuit block 54A, and the terminal BM is connected to the second circuit block 54B. The first to fifth circuit blocks 54A-54D are isolated from each other by the insulation film 52.

The above floating structure provides to function without error even when a common mode noise having a high voltage is applied to the substrate 53.

(Modifications)

In the second embodiment, the impedance may be controlled by changing the resistor 19P, 19M and one of resistors 15P, 15M, 16P, 16M.

Although the impedance element is the resistor, the impedance element may be a capacitor. For example, in the second embodiment, all of resistors 15P, 15M, 16P, 16M, 19P, 19M or a part of resistors 15P, 15M, 16P, 16M, 19P, 19M may be replace with capacitors.

Although the receiver 1 includes the N channel MOSFETs 13P, 13M, 18P, 18M, the receiver 1 may include P channel MOSFETs. Alternatively, the receiver 1 may include NPN transistors and/or PNP transistors.

Although the receiver 1 includes the diodes 14P, 14M, 17P, 17M for preventing backflow, the receiver 1 may not include the diodes for preventing backflow if it is not necessary.

When the current is a detection object of the detection element 5, a resistor for detecting the current may be connected to the transmission line 3. When the electric power is a detection object, the product of the current and the voltage may be detected. A voltage threshold, a current threshold and an electric power threshold may be determined independently, so that the impedance control element is controlled based on a combination of results that define whether the voltage, the current and the electric power respectively exceed the voltage threshold, the current threshold and the electric power threshold. Here, the combination of results is determined by AND conditions, OR conditions and the like.

In the second embodiment, when the receiver 1 functions as a signal transmitter, a switching circuit may be connected in parallel to the resistor 19P, 19M, and the switching circuit is turned on so that the resistor 19P, 19M short-circuits when the receiver 1 transmits a signal.

Although the receiver is used in the LAN system, the receiver may be used in a wire transmission system for communication.

The above disclosure has the following aspects.

According to an aspect of the present disclosure, a signal receiver includes: a receiving circuit that receives a differential signal via a transmission line, which includes a pair of signal wires for transmitting the differential signal; and an impedance control circuit that controls an input impedance so as to reduce a common mode noise. The impedance control circuit includes a detection element for detecting at least one of a voltage, a current and an electric power of the common mode noise, and the impedance control circuit controls the input impedance in accordance with change of the at least one of the voltage, the current and the electric power of the common mode noise.

In the above receiver, only when the common mode noise is applied to the transmission line, the common mode noise is removed by controlling the input impedance of the receiving circuit determining from a transmission line side.

Alternatively, the impedance control circuit may further include a control power source for controlling an electric potential of the transmission line with respect to a ground level. In this case, since the impedance control circuit controls the electric potential of the transmission line by using the control power source, the input impedance is equivalently changeable.

Alternatively, the impedance control circuit may change the input impedance when the at least one of the voltage, the current and the electric power exceeds a predetermined threshold. In this case, the input impedance is rapidly changeable.

Alternatively, the impedance control circuit may further include a series circuit and a comparator. The series circuit includes an impedance element and a switching element, which are coupled in series with each other between each signal wire and a ground. The detection element is a voltage detection element for detecting a voltage of the common mode noise in the transmission line. The comparator compares the voltage of the common mode noise with a positive side threshold voltage, which is defined by adding a predetermined margin voltage to a direct-current voltage between the transmission line and the ground. The switching element is closed when the voltage of the common mode noise exceeds the positive side threshold voltage. In this case, when the common mode noise having the positive polarity is applied to the transmission line, the input impedance of the receiving circuit is controlled by changing the impedance of the control power source and the impedance element.

Alternatively, the impedance control circuit may further include a series circuit and a comparator. The series circuit includes an impedance element and a switching element, which are coupled in series with each other between each signal wire and the control power source. The detection element is a voltage detection element for detecting a voltage of the common mode noise in the transmission line. The comparator compares the voltage of the common mode noise with a negative side threshold voltage, which is defined by subtracting a predetermined margin voltage from a direct-current voltage between the transmission line and the ground. The switching element is closed when the voltage of the common mode noise falls below the negative side threshold voltage. In this case, when the common mode noise having the negative polarity is applied to the transmission line, the input impedance of the receiving circuit is controlled by changing the impedance of the control power source and the impedance element.

Alternatively, the series circuit may further include a backflow prevention element for preventing a backflow of the current when the switching element is closed. In this case, when the switching element turns on, the backflow prevention element prevents the backflow of the current.

Alternatively, the switching circuit may be provided by a MOSFET. In this case, the MOSFET turns on based on the output voltage of the comparator Thus, the MOSFET functions as a switch.

Alternatively, the impedance control circuit may further include a transistor and a control element. The transistor is connected between each signal wire and a ground. The detection element is a voltage detection element for detecting a voltage of the common mode noise in the transmission line, and the control element controls a conduction state of the transistor in accordance with a result of comparison between the voltage of the common mode noise with a positive side threshold voltage, which is defined by adding a predetermined margin voltage to a direct-current voltage between the transmission line and the ground. In this case, when the common mode noise having the positive polarity is applied to the transmission line, the input impedance of the receiving circuit is controlled by changing the impedance of the control power source and the conduction state of the transistor.

Alternatively, the impedance control circuit may further include a transistor and a control element. The transistor is connected between each signal wire and the control power source. The detection element is a voltage detection element for detecting a voltage of the common mode noise in the transmission line, and the control element controls a conduction state of the transistor in accordance with a result of comparison between the voltage of the common mode noise with a negative side threshold voltage, which is defined by subtracting a predetermined margin voltage from a direct-current voltage between the transmission line and the ground. In this case, when the common mode noise having the negative polarity is applied to the transmission line, the input impedance of the receiving circuit is controlled by changing the impedance of the control power source and the conduction state of the transistor.

Alternatively, the detection element may include a pair of resistors, which are coupled in series with each other between the pair of signal wires. The impedance control circuit further includes a positive side impedance element and a positive side switching element, which are coupled between the transmission line and a ground. The impedance control circuit further includes a positive side comparator for comparing the voltage of the common mode noise with a positive side threshold voltage, which is defined by adding a predetermined margin voltage to a direct-current voltage between the transmission line and the ground. The positive side switching element turns on when the voltage of the common mode noise exceeds the positive side threshold voltage. The impedance control circuit further includes a negative side impedance element and a negative side switching element, which are coupled between the transmission line and the ground. The impedance control circuit further includes a negative side comparator for comparing the voltage of the common mode noise with a negative side threshold voltage, which is defined by subtracting a predetermined margin voltage from a direct-current voltage between the transmission line and the ground, and the negative side switching element turns on when the voltage of the common mode noise falls below the negative side threshold voltage. Further, the transmission line may be coupled with the ground via the positive side impedance element when the voltage of the common mode noise exceeds the positive side threshold voltage, and the transmission line may be coupled with the power source via the negative side impedance element when the voltage of the common mode noise falls below the negative side threshold voltage.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A signal receiver comprising:
    a receiving circuit that receives a differential signal via a transmission line, which includes a pair of signal wires for transmitting the differential signal; and
    an impedance control circuit that controls an input impedance so as to reduce a common mode noise,
    wherein the impedance control circuit includes a detection element for detecting at least one of a voltage, a current and an electric power of the common mode noise, and
    wherein the impedance control circuit controls the input impedance in accordance with change of the at least one of the voltage, the current and the electric power of the common mode noise,
    wherein the detection element includes a pair of resistors, which are coupled in series with each other between the pair of signal wires,
    wherein the impedance control circuit further includes a positive side impedance element and a positive side switching element, which are coupled between the transmission line and a ground,
    wherein the impedance control circuit further includes a positive side comparator for comparing the voltage of the common mode noise with a positive side threshold voltage, which is defined by adding a predetermined margin voltage to a direct-current voltage between the transmission line and the ground,
    wherein the positive side switching element turns on when the voltage of the common mode noise exceeds the positive side threshold voltage,
    wherein the impedance control circuit further includes a negative side impedance element and a negative side switching element, which are coupled between the transmission line and the ground,
    wherein the impedance control circuit further includes a negative side comparator for comparing the voltage of the common mode noise with a negative side threshold voltage, which is defined by subtracting a predetermined margin voltage from a direct-current voltage between the transmission line and the ground, and
    wherein the negative side switching element turns on when the voltage of the common mode noise falls below the negative side threshold voltage.

2. The signal receiver according to claim 1,
    wherein the impedance control circuit further includes a control power source for controlling an electric potential of the transmission line with respect to a ground level.

3. The signal receiver according to claim 2,
    wherein the impedance control circuit further includes a series circuit and a comparator,
    wherein the series circuit includes an impedance element and a switching element, which are coupled in series with each other between each signal wire and the control power source,
    wherein the detection element is a voltage detection element for detecting a voltage of the common mode noise in the transmission line,
    wherein the comparator compares the voltage of the common mode noise with a negative side threshold voltage, which is defined by subtracting a predetermined margin voltage from a direct-current voltage between the transmission line and the ground, and
    wherein the switching element is closed when the voltage of the common mode noise falls below the negative side threshold voltage.

4. The signal receiver according to claim 2,
    wherein the impedance control circuit further includes a transistor and a control element,
    wherein the transistor is connected between each signal wire and the control power source,
    wherein the detection element is a voltage detection element for detecting a voltage of the common mode noise in the transmission line, and wherein the control element controls a conduction state of the transistor in accordance with a result of comparison between the voltage of the common mode noise with a negative side threshold voltage, which is defined by subtracting a predetermined margin voltage from a direct-current voltage between the transmission line and the ground.

5. The signal receiver according to claim 1,
wherein the impedance control circuit changes the input impedance when the at least one of the voltage, the current and the electric power exceeds a predetermined threshold.

6. The signal receiver according to claim 1,
wherein the impedance control circuit further includes a series circuit and a comparator,
wherein the series circuit includes an impedance element and a switching element, which are coupled in series with each other between each signal wire and a ground,
wherein the detection element is a voltage detection element for detecting a voltage of the common mode noise in the transmission line,
wherein the comparator compares the voltage of the common mode noise with a positive side threshold voltage, which is defined by adding a predetermined margin voltage to a direct-current voltage between the transmission line and the ground, and
wherein the switching element is closed when the voltage of the common mode noise exceeds the positive side threshold voltage.

7. The signal receiver according to claim 6,
wherein the series circuit further includes a backflow prevention element for preventing a backflow of the current when the switching element is closed.

8. The signal receiver according to claim 7,
wherein the switching circuit is provided by a MOSFET.

9. The signal receiver according to claim 1,
wherein the impedance control circuit further includes a transistor and a control element,
wherein the transistor is connected between each signal wire and a ground,
wherein the detection element is a voltage detection element for detecting a voltage of the common mode noise in the transmission line, and
wherein the control element controls a conduction state of the transistor in accordance with a result of comparison between the voltage of the common mode noise with a positive side threshold voltage, which is defined by adding a predetermined margin voltage to a direct-current voltage between the transmission line and the ground.

10. The signal receiver according to claim 1,
wherein the transmission line is coupled with the ground via the positive side impedance element when the voltage of the common mode noise exceeds the positive side threshold voltage, and wherein the transmission line is coupled with the power source via the negative side impedance element when the voltage of the common mode noise falls below the negative side threshold voltage.

* * * * *